United States Patent
Damnjanovic et al.

(10) Patent No.: US 10,149,293 B2
(45) Date of Patent: Dec. 4, 2018

(54) TRANSMISSION PREEMPTION FOR ENHANCED COMPONENT CARRIERS

(71) Applicant: QUALCOMM Incorporated, San Diego, CA (US)

(72) Inventors: Jelena Damnjanovic, Del Mar, CA (US); Aleksandar Damnjanovic, Del Mar, CA (US); Taesang Yoo, Riverside, CA (US); Siddhartha Mallik, San Diego, CA (US); Madhavan Srinivasan Vajapeyam, San Diego, CA (US); Durga Prasad Malladi, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 14/861,693

(22) Filed: Sep. 22, 2015

(65) Prior Publication Data

US 2016/0113008 A1 Apr. 21, 2016

Related U.S. Application Data

(60) Provisional application No. 62/064,934, filed on Oct. 16, 2014.

(51) Int. Cl.
*H04W 72/04* (2009.01)
*H04L 5/00* (2006.01)
(Continued)

(52) U.S. Cl.
CPC .......... *H04W 72/0446* (2013.01); *H04L 5/00* (2013.01); *H04W 72/042* (2013.01);
(Continued)

(58) Field of Classification Search
CPC .......... H04W 72/0446; H04W 72/042; H04W 72/085; H04W 72/14; H04L 5/00
See application file for complete search history.

(56) References Cited

U.S. PATENT DOCUMENTS

2002/0045458 A1* 4/2002 Parantainen .......... H04W 40/00
455/466
2012/0002583 A1* 1/2012 Kong .................. H04W 92/045
370/312
(Continued)

FOREIGN PATENT DOCUMENTS

WO WO-2013114504 A1 8/2013

OTHER PUBLICATIONS

IEEE Standard for Air Interface for Broadband Wireless Access Systems: IEEE Std 802.16/2012 (Revision of IEEE Std 802.16-2009), IEEE Standard, IEEE Piscataway, NJ, USA Aug. 17, 2012 (Aug. 17, 2012), XP068045678, ISBN: 978-0-7381-7291-0.*
(Continued)

*Primary Examiner* — Michael Thier
*Assistant Examiner* — Brian P Cox
(74) *Attorney, Agent, or Firm* — Holland & Hart LLP

(57) ABSTRACT

Techniques are described for preempting resource allocations to one or more UEs in the event that delay sensitive data is received. A resource allocation of a number of symbols may be granted to a first user equipment (UE) for first associated data to be transmitted. Subsequently, data may be received for a second UE that is more delay sensitive than the first data. The resource allocation to the first UE may be preempted, and resources allocated to the second UE for the second data within a variable length transmission time interval (TTI) of the resource allocation to the first UE. UEs may monitor for preemption during transmissions to other UEs in order to receive new resource grants associated with the preempted resource grant. Whether a UE monitors
(Continued)

transmissions for preemption may be determined based on a quality or service (QoS) of the UE.

24 Claims, 16 Drawing Sheets

(51) Int. Cl.
  *H04W 76/27* (2018.01)
  *H04W 72/08* (2009.01)
  *H04W 72/14* (2009.01)
  *H04W 88/08* (2009.01)

(52) U.S. Cl.
  CPC ......... *H04W 72/085* (2013.01); *H04W 72/14* (2013.01); *H04W 76/27* (2018.02); *H04W 88/08* (2013.01)

(56) References Cited

U.S. PATENT DOCUMENTS

| | | | | |
|---|---|---|---|---|
| 2012/0327821 A1* | 12/2012 | Lin | ............... | H04W 72/048 370/280 |
| 2013/0336301 A1* | 12/2013 | Deng | ............... | H04W 72/1289 370/336 |
| 2014/0247795 A1* | 9/2014 | Kim | ............... | H04W 72/042 370/329 |

OTHER PUBLICATIONS

IPEA/EP, Second Written Opinion of the International Preliminary Examining Authority, Int'l Application No. PCT/US2015/051766, dated Sep. 26, 2016, European Patent Office, Rijswijk, NL, 9 pgs.

IEEE, "IEEE Standard for Air Interface fo Broadband Wireless Access Systems; IEEE Std. 802.16-2012 (Revision of IEEE Std 802.16-2009)," IEEE Standard, Aug. 17, 2012, 2442 pgs. (in particular, pp. 107, 648-653, 901, 992-1004), ISBN 978-0-7381-7291-0, Institute of Electrical and Electronics Engineers, Piscataway, NJ.

ISA/EPO, International Search Report and Written Opinion of the International Searching Authority, Int'l App. No. PCT/US2015/051766, dated Mar. 17, 2016, European Patent Office, Rijswijk, NL, 26 pgs.

3GPP, "3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 v12.3.0 (Sep. 2014) Technical Specification, Sep. 2014, pp. 1-378, XP_0509255644, 3rd Generation Partnership Project.

ISA/EPO, Partial International Search Report of the International Searching Authority, Int'l. App. No. PCT/US2015/051766, dated Dec. 10, 2015, European Patent Office, Rijswijk, NL, 7 pgs.

* cited by examiner

TRANSMISSION PREEMPTION FOR ENHANCED COMPONENT CARRIERS

CROSS REFERENCES

The present application for patent claims priority to U.S. Provisional Patent Application No. 62/064,934 by Damnjanovic et al., entitled "Transmission Preemption for Enhanced Component Carriers," filed Oct. 16, 2014, assigned to the assignee hereof, and expressly incorporated by reference herein.

BACKGROUND

The present disclosure, for example, relates to wireless communication systems, and more particularly to preemption of an allocation of resources in a system employing variable length transmission time intervals.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In some instances, when a base station schedules resource allocations to various different UEs, the type of data that is to be transferred between the UE and base station may be considered when prioritizing scheduling of resource allocations. For example, delay sensitive data may be given a higher priority, and transmitted ahead of other data that may be more delay insensitive. In many instances, a quality of service (QoS) metric associated with the data may be used for such scheduling and resource allocation determinations. In some instances, delay sensitive data may arrive in a transmission queue after resources have been allocated for more delay insensitive data. In traditional systems, the delay sensitive data may need to wait until the scheduled data has been transmitted.

SUMMARY

The described features generally relate to one or more improved systems, methods, and/or devices for preempting resource allocations to one or more UEs in the event that delay sensitive data is to be transmitted within a wireless communications system. In some examples, base stations and UEs within the wireless communications system may use variable length downlink or uplink transmission time intervals (TTIs). A resource allocation of a number of symbols may be granted to a first UE for first associated data to be transmitted. Subsequent to the resource allocation to the first UE, data may be received for a second UE that is more delay sensitive than the first data. The resource allocation to the first UE may be preempted, and resources allocated to the second UE for the second data within a variable length TTI of the resource allocation to the first UE. Certain UEs may receive signaling that indicates that the UE is to monitor for preemption during transmissions to other UEs. Certain UEs may not monitor for preemption during the transmissions to other UEs, and may conserve energy by not monitoring communications until a subsequent transmission that indicates another resource grant. Whether a UE monitors transmissions for preemption may be determined based on a QoS of data that is expected to be transmitted to the UE, for example.

A method of wireless communication by a first UE is described. The method may include receiving a downlink grant that assigns resources of one or more symbols in a variable length downlink transmission time interval (TTI). The method may also include monitoring the one or more of the symbols for a control signal indicating that a portion of the resources assigned by the downlink grant is to be preempted. Furthermore, the method may include determining whether to cancel at least the portion of the resources granted by the downlink grant based on the control signal.

An apparatus for wireless communication by a first user equipment (UE) in communication with a base station is described. The apparatus may include means for receiving a downlink grant that assigns resources of one or more symbols in a variable length downlink TTI. The apparatus may also include means for monitoring one or more of the symbols with the assigned resources for a control signal indicating that a portion of the downlink grant is to be preempted. Furthermore, the apparatus may include means for determining whether to cancel at least the portion of the resources granted by the downlink grant based on the control signal.

A further apparatus is described. The apparatus may include a processor, memory in electronic communication with the processor, and instructions stored in the memory. The instructions may be operable to cause the apparatus to receive a downlink grant that assigns resources of one or more symbols in a variable length downlink TTI. The instructions may also be operable to cause the apparatus to monitor one or more of the symbols with the assigned resources for a control signal indicating that a portion of the downlink grant is to be preempted. Furthermore, the instructions may be operable to cause the apparatus to determine whether to cancel at least the portion of the resources assigned by the downlink grant based on the control signal.

A non-transitory computer-readable medium is described. The non-transitory computer-readable medium may include instructions executable to receive a downlink grant including one or more symbols in a variable length downlink transmission time interval. The non-transitory. The instructions may be further executable to monitor one or more of the symbols in the downlink grant for a control signal indicating that a portion of the downlink grant is to be preempted. The instructions may also be executable to determine whether to cancel at least the portion of the downlink grant based on the control signal.

Some examples of the method, apparatus, or non-transitory computer-readable medium described above may further include processes, features, means, or instructions for cancelling at least the portion of the resources assigned by the downlink grant based on the determining. In some examples of the method, apparatus, or computer-readable medium above, the determining may include determining that the control signal is received in a symbol within a threshold number of symbols from a last symbol of the variable length downlink TTI. The determining may also include maintaining the resources assigned by the downlink grant by continuing to receive any remaining symbols of the variable length downlink TTI.

In some examples of the method, apparatus, or non-transitory computer-readable medium described above, the control signal may include a second downlink grant for downlink transmissions to a second UE. In other examples of the method, apparatus, or non-transitory computer-readable medium, the downlink transmissions to the second UE may be more delay sensitive than downlink data associated with the resources assigned by the downlink grant to the first UE.

In some examples of the method, apparatus, or non-transitory computer-readable medium described above, the control signal may include an uplink grant for a subsequent symbol. In other examples of the method, apparatus, or non-transitory computer-readable medium described above, the control signal may include a common signal decoded by a plurality of UEs. In some examples of the method, apparatus, or non-transitory computer-readable medium described above, the plurality of UEs may be configured to monitor for the control signal via radio resource control (RRC) signaling.

In some examples of the method, apparatus, or non-transitory computer-readable medium described above, monitoring one or more of the symbols may include monitoring one or more predetermined symbols within the one or more symbols that have resources assigned by the downlink grant. In other examples of the method, apparatus, or non-transitory computer-readable medium described above, the predetermined symbols may be designated in one or more of the downlink grant or via radio resource control (RRC) signaling.

Some examples of the method, apparatus, or non-transitory computer-readable medium described above may further include processes, features, means, or instructions for canceling at least the portion of the resources assigned by the downlink grant based at least in part on the control signal. Some examples of the method, apparatus, or non-transitory computer-readable medium described above may further include processes, features, means, or instructions for determining a duration of a second downlink associated with the control signal. Some examples of the method, apparatus, or non-transitory computer-readable medium described above may further include processes, features, means, or instructions for suspending monitoring of downlink transmissions during the determined duration. Some examples of the method, apparatus, or non-transitory computer-readable medium described above may further include processes, features, means, or instructions for continuing monitoring of downlink transmissions following the determined duration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described for preempting resource allocations to one or more UEs in the event that delay sensitive data is to be transmitted within a wireless communications system. In some examples, base stations and UEs within the wireless communications system may use variable length downlink or uplink transmission time intervals (TTIs). A resource allocation of a number of symbols may be granted to a first UE for first associated data to be transmitted. Subsequent to the resource allocation to the first UE, data may be received for a second UE that is more delay sensitive than the first data. The resource allocation to the first UE may be preempted, and resources allocated to the second UE for the second data within a variable length TTI of the resource allocation to the first UE. Certain UEs may receive signaling that indicates that the UE is to monitor for preemption during transmissions to other UEs. Certain UEs may not monitor for preemption during the transmissions to other UEs, and may conserve energy by not monitoring communications until a subsequent transmission that indicates another resource grant. Whether a UE monitors transmissions for preemption may be determined based on a QoS of data that is expected to be transmitted to the UE, for example.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
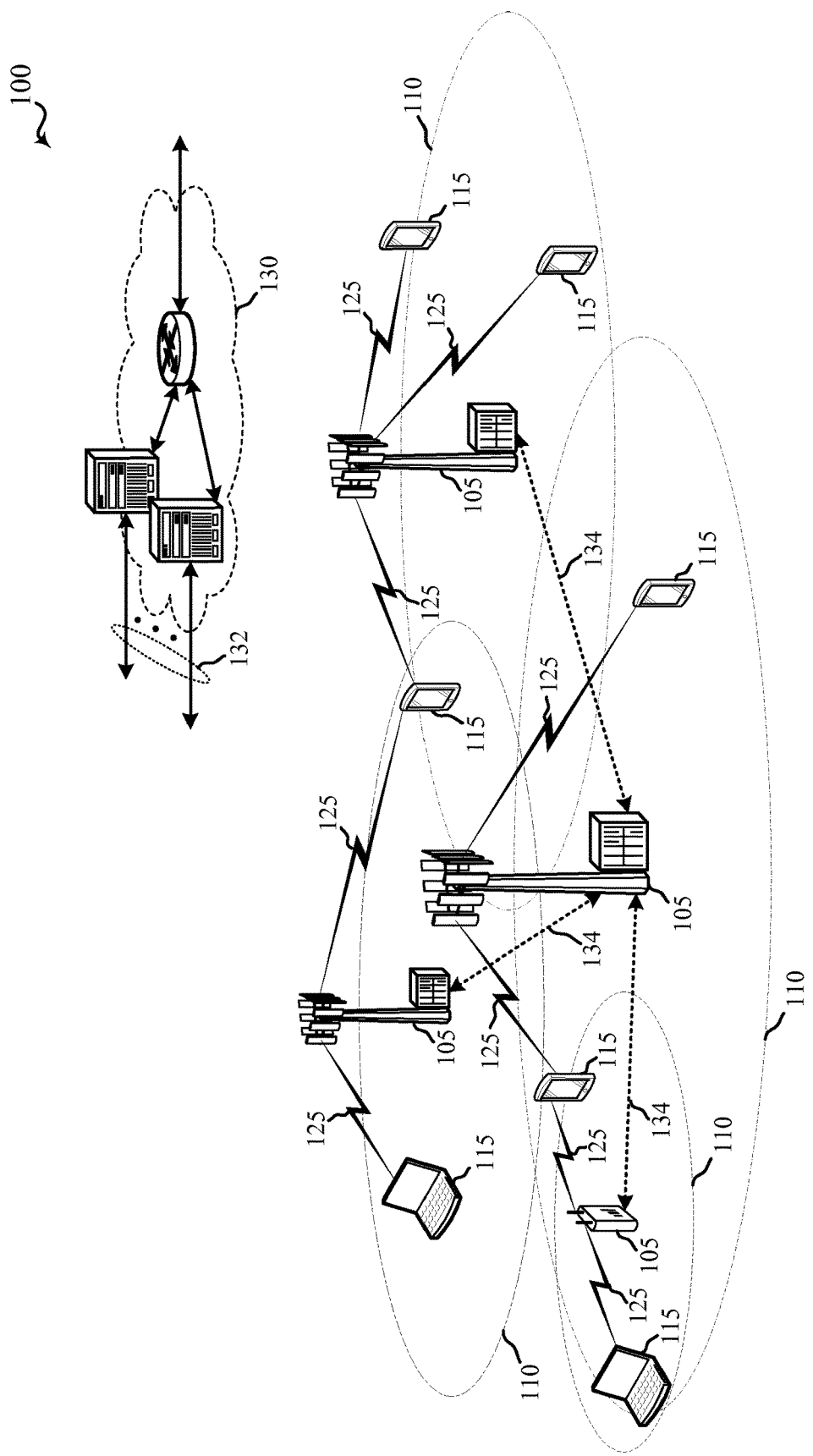
FIG. 1 shows a block diagram of a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, at least a portion of the wireless communications system 100 may be configured to operate using variable length TTIs, in which downlink and uplink TTIs may be dynamically adjusted to provide flexibility to dynamically adapt to particular traffic needs at a particular moment. A certain number of downlink symbols may be allocated in a downlink resource grant given by an access point or base station 105 to a particular UE 115. In some examples, resource grants provided to a UE 115 may assign a relatively large number of downlink symbols in order to enhance transmission efficiency of data transmissions to the UE 115. In the event that delay sensitive traffic is received for transmission to a different UE 115, an access point or base station 105 may preempt the initial downlink grant and provide a new downlink grant to assign resources to the different UE 115 in order to quickly transmit the delay sensitive data. In some examples, control signaling may be used to indicate the preemption, and the existence of the control during a multi-symbol downlink scheduled TTI may alerts the currently scheduled UE 115 about the preemption of the previously granted resources, and the UE 115 may cancel resources assigned by the previous downlink grant. For instance, the UE 115 may not operate on or use all resource assigned by the previous grant. The access point or base station 105 may provide a new downlink grant to assign resources to the different UE 115. Examples of such variable length TTIs and transmission preemption techniques will be described in more detail below.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
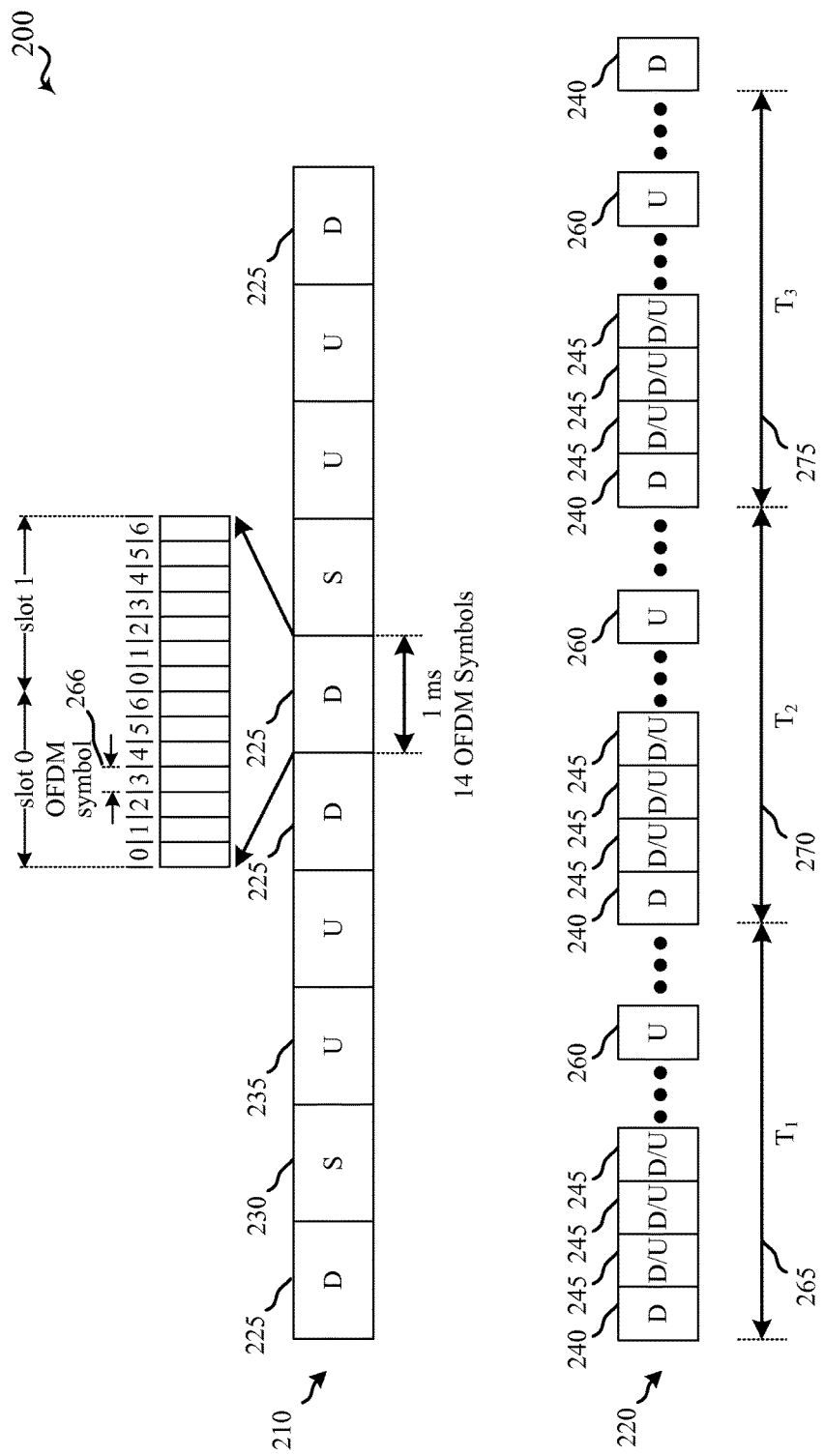
FIG. 2 is a diagram illustrating an example of primary cell and secondary cell frame structures that may be used in a wireless communication system, in accordance with an aspect of the present disclosure.

As discussed above, various examples provide communications in a wireless communications system, such as wireless communications system 100 of FIG. 1, that utilize variable TTIs. FIG. 2 is a block diagram 200 conceptually illustrating an example of radio frames and different subframes that may be transmitted using different cells of a wireless communication system, such as wireless communications system 100 of FIG. 1, in accordance with aspects of the present disclosure. The radio frames of FIG. 2 may be transmitted using portions of the wireless communications system 100 described with reference to FIG. 1 between one or more access points or base station 105 and one or more UEs 115, for example. In this example, a legacy primary cell (PCell) transmission 210 may include a TDD frame that include ten 1 ms subframes that include downlink subframes 225, special subframes 230, and uplink subframes 235. The downlink subframes 225, special subframes 230, and uplink subframes 235 may include a subframe structure defined according to established LTE standards, which may include 14 legacy symbols 266 within each 1 ms subframe. In some examples, downlink subframes 225 may include one or more downlink symbols, which may each be or include one or several orthogonal frequency division multiplexing (OFDM) symbols, uplink subframes may include single carrier frequency division multiplexing (SC-FDM) symbols, and special subframes 230 may include both uplink SC-FDM symbols and downlink OFDM symbols.

In the example of FIG. 2, secondary cell (SCell) transmissions 220 may include low latency or burst mode transmissions that may replace the legacy frame structure with a TDD-based frame structure that allows for dynamic switching between downlink and uplink symbols and for variable TTI lengths.

While the example of FIG. 2 shows the low latency or burst mode transmissions on a SCell, it will be understood that such transmission structures, as well as various of the techniques and principles described herein, may be implemented in other transmissions, such as within one or more burst mode subframes of a legacy LTE frame, in other PCell transmissions, in licensed or unlicensed spectrum. etc. In the example of FIG. 2, the SCell transmissions 220, which may be referred to as enhanced component carrier (eCC) transmissions, may include designated downlink symbols 240 and designated uplink symbols 260, and flexible symbols 245 that may be allocated as uplink or downlink symbols based on particular traffic needs.

The designated downlink symbols 240 and designated uplink symbols 260 may be provided to enable various radio resource management (RRM) measurements, synchronization, CSI feedback, random access channel (RACH) and scheduling request (SR) communications, for example. The designated downlink symbols 240 and designated uplink symbols 260 may be configured by a base station, such as base stations 105 of FIG. 1, and may be communicated to one or more UEs, such as UEs 115 of FIG. 1, via one or more of RRC signaling, a system information block (SIB), or PDCCH signaling. As mentioned, flexible symbols 245 may be switched to be uplink or downlink symbols, and the indication of such configurations may be provided by a base station in a resource grant that allocates uplink resources, downlink resources, or both, and that is provided to a UE. Based on such an allocation, the UE may determine that a certain number of symbols 240, 245, 260 may be allocated for communications between the UE and the base station.

With such dynamic switching of symbols, a base station and UE are not required to look ahead in terms of a number of uplink or downlink subframes for an entire radio frame, but may determine particular resource allocations in a dynamic and flexible manner. The number of resources allocated for a particular UE may be determined, for example, on an amount of data to be transmitted between the UE and the base station, and a latency requirement or quality of service (QoS) requirement associated with the data. In some examples, each of the symbols 240, 245, and 260 may have a reduced symbol duration relative to the legacy OFDM or SC-FDM symbols (e.g., symbols 266), and in some examples have a symbol duration of 11.36 $\mu$s per symbol, including a useful symbol duration of 8.33 $\mu$s and a cyclic prefix duration of 2.03 $\mu$s. Symbols 240, 245, and 260 may have increased tone spacing for subcarriers relative to legacy symbols, and in some examples have a tone spacing of 120 kHz, and utilize a relatively wide bandwidth (e.g., 80 MHz).

Such shortened symbol duration and dynamic switching between downlink and uplink communications may allow for reduced acknowledgment/negative acknowledgment (ACK/NACK) turn-around time, and may thus provide relatively low latency transmissions of data. In some examples, delay sensitive data may be transmitted using SCell transmissions 220, while other data that is not as delay sensitive may be transmitted using PCell transmissions 210. In some examples, a number of symbols 240, 245, and 260 may be allocated to a first UE for a first time period ($T_1$) 265, and may be allocated to the first UE or one or more other UEs during a second time period ($T_2$) 270 and third time period ($T_3$) 275. The length of such time periods 265, 270, 275 may be determined according to one or more of a variety of factors such as, for example, an amount of data to be transmitted, a QoS associated with the data, a delay requirement of the data, a number of other UEs present, or channel conditions, to name but a few.

Figure 3:
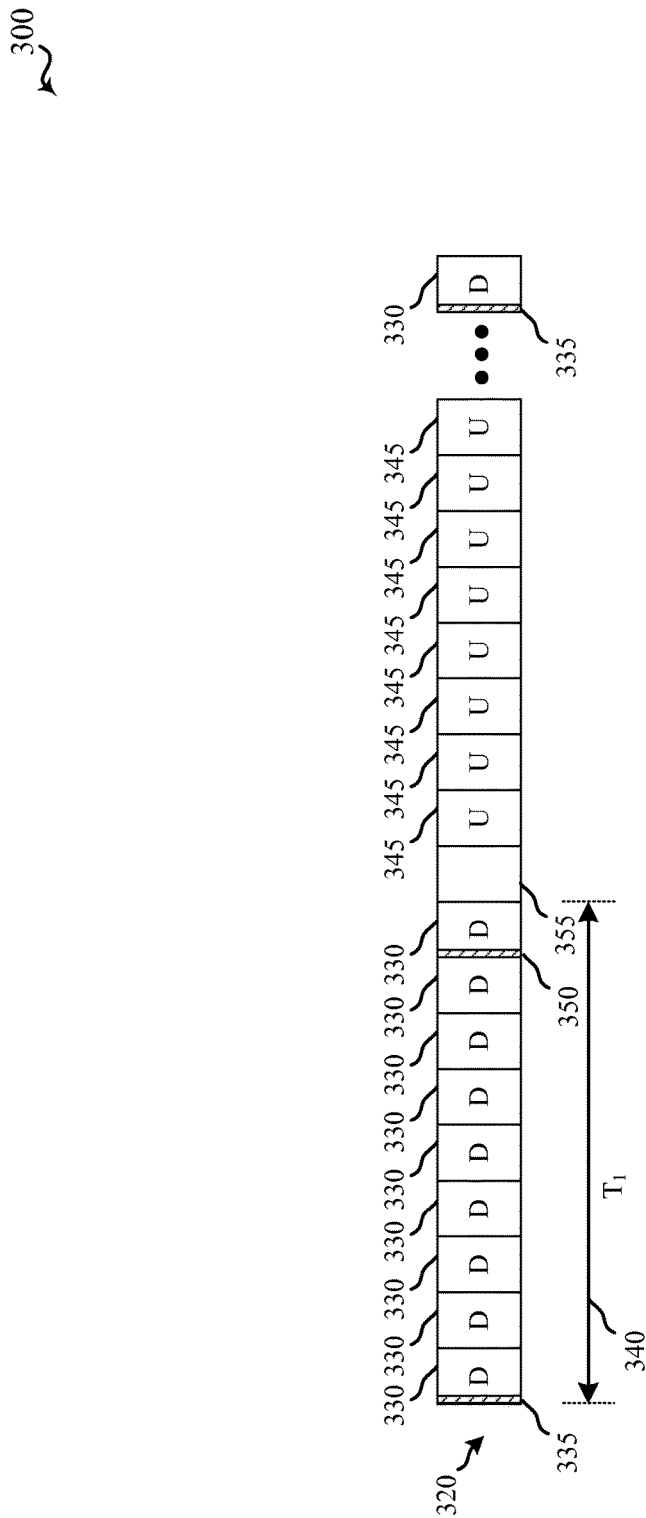
FIG. 3 is a diagram illustrating an example of dynamic downlink and uplink grants and associated downlink and uplink transmission symbols of a wireless communication system, in accordance with an aspect of the present disclosure.

With reference now to FIG. 3 a block diagram 300 conceptually illustrating an example of eCC transmissions is discussed. In the example of FIG. 3, eCC transmissions 320 may include a number of symbols allocated as uplink or downlink symbols. Such transmissions 320 may be transmitted using different cells of a wireless communication system, such as wireless communications system 100 of FIG. 1, in accordance with aspects of the present disclosure. In some examples, transmissions 320 are transmitted on a SCell such as discussed above with respect to FIG. 2. In the example of FIG. 3, a first time period ($T_1$) 340 may include a downlink grant or assignment of nine downlink symbols 330. In this example, an initial downlink symbol 330 may include control information 335 that may indicate resource allocations for an upcoming time period (e.g., $T_1$ 340).

In some examples, the control information 335 may include a downlink grant that assigns resources to a UE that include the subsequent symbols 330. In this example, a subsequent transmission of control information 350 may include an uplink grant that assigns eight uplink symbols 345. A blank symbol 355 may be included between a downlink symbol 330 and an uplink symbol 345, to allow time for switching at a UE. In some examples, bundles of symbols 330, 345 may be allocated to a UE by a base station, with a length of such bundles controlled by control information (e.g., dynamic grants) 335, 350. A relatively large number of symbols may be allocated to provide enhanced efficiency in some examples that are somewhat less delay sensitive. The symbols 330, 345, and 355 may include one or more OFDM symbols.

Figure 4:
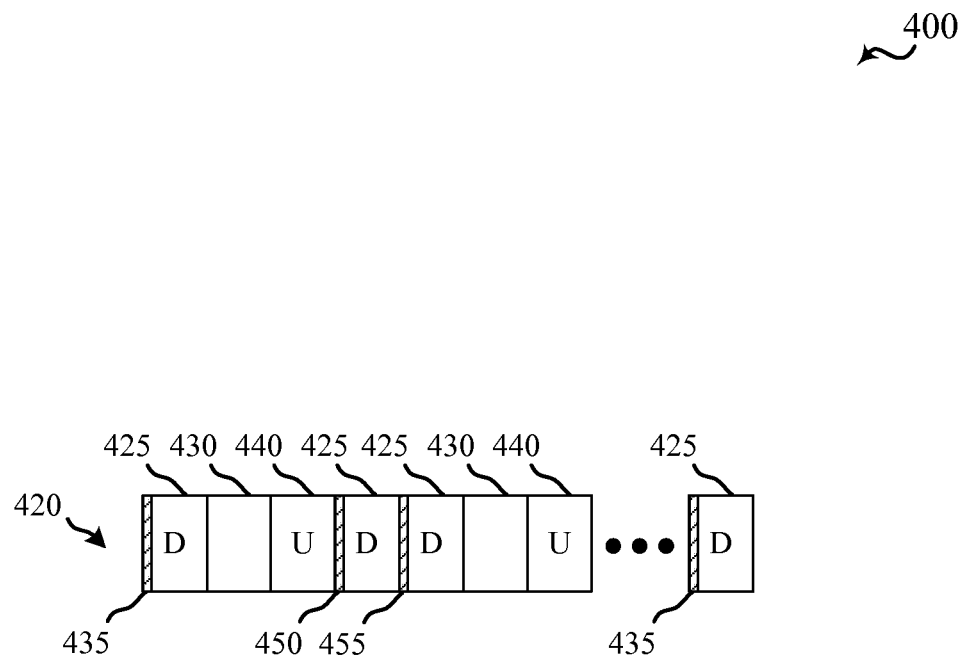
FIG. 4 is a diagram illustrating another example of dynamic downlink and uplink grants and associated downlink and uplink transmission symbols of a wireless communication system, in accordance with an aspect of the present disclosure.

In other examples, if data transmissions are relatively delay sensitive, dynamic grants to a particular UE may be relatively short in order to provide for reduced ACK/NACK turn-around times. FIG. 4 illustrates an example 400 of relatively short grants. In this example, eCC transmissions 420 may include resource allocations of only one or two symbols. The eCC transmissions 420 of FIG. 4 may be transmitted using a wireless communication system, such as wireless communications system 100 of FIG. 1, in accordance with aspects of the present disclosure. In some examples, transmissions 420 are transmitted on a SCell such as discussed above with respect to FIGS. 2 and 3. In this example, control information 435 in the initial downlink symbol 425 may include a downlink grant that assigns one downlink symbol (i.e., TTI=1 symbol) and an uplink grant that assigns one uplink symbol (i.e., TTI=1 symbol). The uplink grant, in various examples, may take effect at a two symbol minimum from the receipt of the control information 435, in order to accommodate blank symbol 430 and allow for switching at the UE to transmit uplink symbol 440. In this example, eCC transmissions 420 include a transmission of second control information 450 which, in this example, is a downlink grant for two downlink symbols (e.g., TTI=2 symbols), with third control information 455 providing a subsequent uplink grant which may have a TTI of one or more uplink symbols 440.

Figure 5:
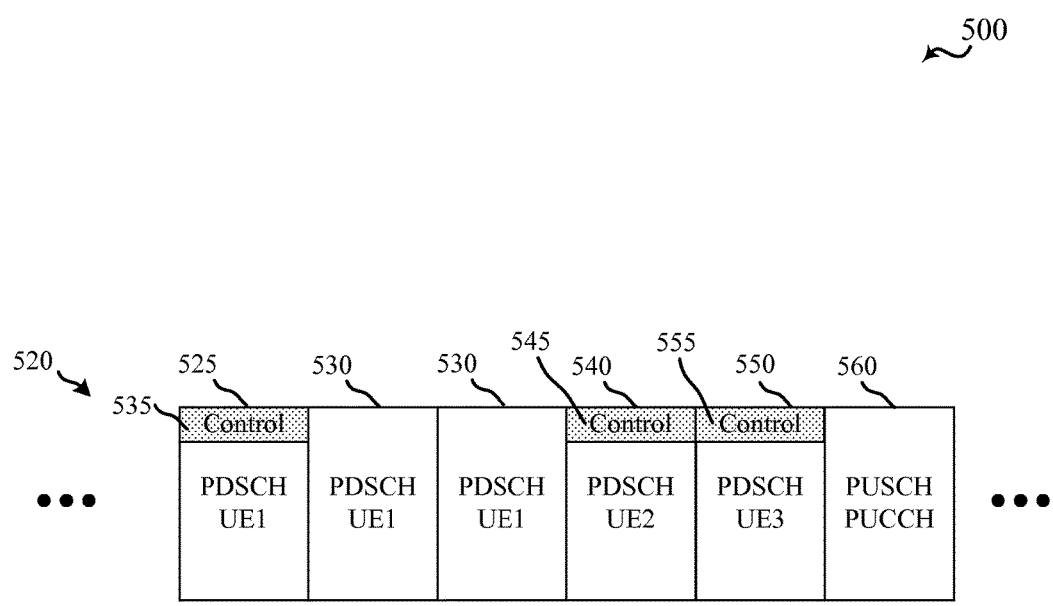
FIG. 5 is a diagram illustrating an example of a variable length TTI in which control signaling in a symbol indicates transmission preemption of the variable length TTI, in accordance with an aspect of the present disclosure.

As mentioned above, various examples provide that a resource grant to a particular UE may be preempted in the event that delay sensitive data is received for transmission to a second UE. With reference now to FIG. 5, an example 500 of a resource grant and subsequent preemption of the resource grant within eCC transmissions 520 is discussed. The eCC transmissions 520 of FIG. 5 may be transmitted using a wireless communication system, such as wireless communications system 100 of FIG. 1, in accordance with aspects of the present disclosure. In some examples, transmissions 520 are transmitted on a SCell such as discussed above with respect to one or more of FIG. 2, 3, or 4.

In the example of FIG. 5, a first downlink symbol 525 may include control information 535 that may include a downlink grant that assigns resources to a first UE (UE1) that includes a number of downlink symbols. For example, the control information 535 may include a downlink grant that assigns 9 downlink symbols, and an uplink grant that assigns 8 uplink symbols, similarly as discussed above with respect to FIG. 3. In this example, two downlink symbols 530 are transmitted to the first UE. Subsequent to the downlink grant and the assignment of resources, delay sensitive data may be received for a second UE (UE2). In the example of FIG. 5, the base station may transmit control information 545 in the fourth downlink symbol 540. The control information may indicate to the first UE that the existing downlink grant has been preempted and thus assigned resources have been reassigned. The first UE, upon receiving the control information, may cancel the remaining portion of the resources assigned by the downlink grant. The base station may transmit downlink data to the second UE in a downlink symbol 540. In some examples, the control information 545 may include a downlink grant to the second UE.

In this example, downlink data for a third UE (UE3) may also be received, and the base station may transmit control information 555 that indicates that the next downlink symbol 550 is allocated for (e.g., assigned for) downlink data to the third UE. The control information 555 may also provide an uplink grant for an uplink symbol 560. Transmitting such control information 545, 555, enables the base station to quickly schedule delay sensitive traffic, even during the on-going downlink transmission of the longer length TTI initially allocated in the downlink grant included in control information 525. Without such preemption, a base station may need to wait until an existing scheduled grant is completed before transmitting delay sensitive data. In some examples, the existence of the control information 545, 555 during the multi-symbol downlink scheduled TTI alerts the scheduled UE (e.g., first UE) about the preemption of the previously given grant, and the first UE may cancel the previously given multi-symbol assignment. Furthermore, in some examples, an uplink grant may be sent in the same control information 545, 555, that is used to preempt a grant to a UE.

In some examples, all UEs in communication with the base station, or a subset of UEs, may monitor the existence of control in every symbol to determine if a grant is preempted and for the possibility that a new grant may be given to a different UE. In some examples, a UE may be configured to monitor for preemption through control signaling, such as radio resource control (RRC) signaling, for example. A base station may determine that a particular UE should monitor for control information 545, 555, based on one or more factors, such as, for example, delay sensitivity of data that is likely to be transmitted to the UE that may be determined based on one or more active services of the UE and an associated quality of service (QoS) of data transmitted according to those services. For example, depending on the QoS, some UEs may not be delay sensitive, so they do not have to perform the control monitoring continuously, and are thus are not be eligible to receive new grants based on a preempted grant. Such delay insensitive UEs may, in some examples, go to 'sleep' after they receive the notification about the downlink assignment duration. A currently multi-symbol scheduled UE performs control monitoring continuously, regardless of its RRC-configured preemption configuration, in order to be aware of the possible assignment cancellation. In some examples, a currently scheduled UE, upon having a multi-symbol downlink grant preempted, may monitor subsequent symbols for control information and possible preemption. In examples where a currently scheduled UE has a relatively low QoS, such a UE may be configured not to monitor subsequent symbols for control information.

In certain examples, the control information may include a common signal that may be decoded by a number of UEs. In some examples, one or more predetermined symbols within a multi-symbol downlink grant may be eligible to include a control signal that includes the control information for preemption of an existing grant. For example, if a downlink grant is a relatively short downlink grant, such as for only two or three downlink symbols, for example, such a grant may be ineligible for preemption because a subsequent grant may be scheduled in a relatively short length of time. Thus, UEs may be aware that is a grant is for less than a threshold number of symbols, no control signals indicating preemption will be transmitted. In other examples, control signals may be transmitted in certain symbols, such as at a set periodicity, that may allow UEs to monitor only certain symbols. Such predetermined symbols may be designated in, for example, one or more of the downlink grant, RRC signaling, in a PDCCH signal, or a system information block (SIB).

Figure 6:
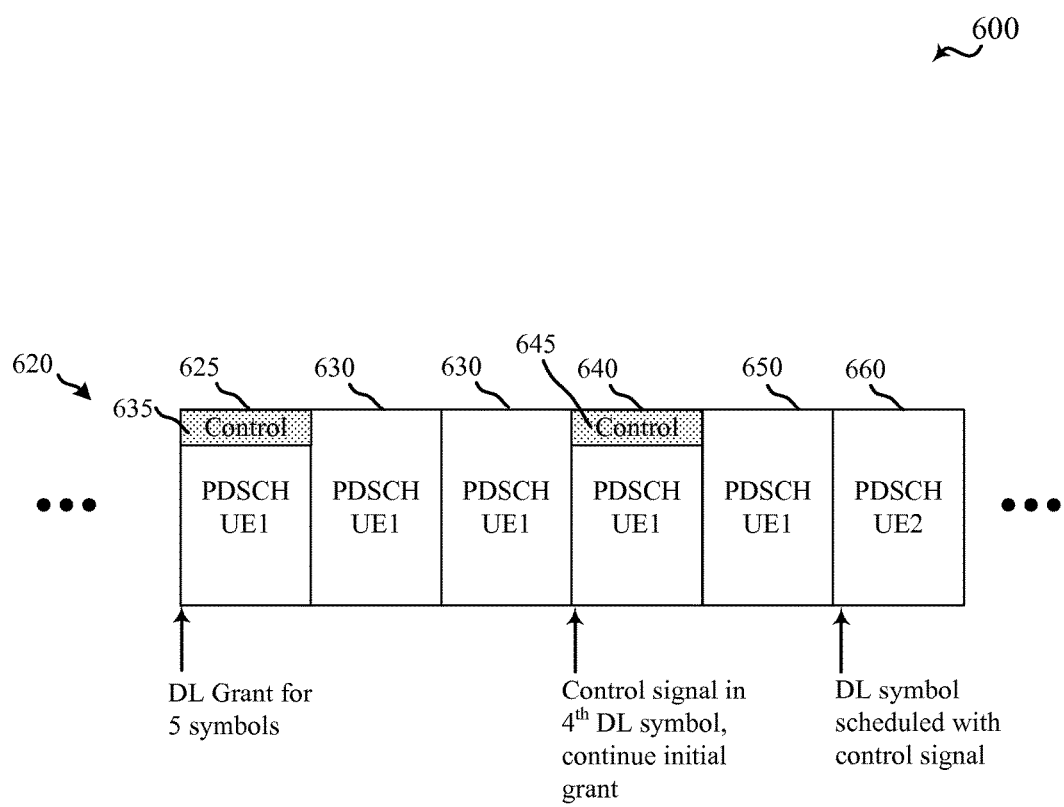
FIG. 6 is a diagram illustrating another example of a variable length TTI in which control signaling in a symbol indicates transmission preemption of the variable length TTI, in accordance with an aspect of the present disclosure.

In certain examples, if a control signal is received within a threshold number of symbols from the end of a grant, the currently scheduled grant may be completed. With reference now to FIG. 6, another example 600 of a resource grant and subsequent control signal transmission within eCC transmissions 620 is discussed. The eCC transmissions 620 of FIG. 6 may be transmitted using a wireless communication system, such as wireless communications system 100 of FIG. 1, in accordance with aspects of the present disclosure. In some examples, transmissions 620 are transmitted as an eCC on a SCell such as discussed above with respect to one or more of FIG. 2, 3, 4 or 5.

In the example of FIG. 6, a first downlink symbol 625 may include control information 635 that may include a downlink grant to a first UE (UE1) for some number of downlink symbols. For example, the control information 635 may include a downlink grant for five downlink symbols. In this example, two downlink symbols 630 are transmitted to the first UE. Subsequent to the downlink grant, delay sensitive data may be received for a second UE (UE2). In the example of FIG. 6, the base station may transmit control information 645 in the fourth downlink symbol 640. The control information may indicate to the first UE that the existing downlink grant has been preempted. However, because the initially scheduled downlink grant is scheduled to be completed within a threshold number of symbols (e.g., 2 symbols), the existing grant may be completed by transmitting downlink symbols 640 and 650 to the first UE. Following the completion of the transmission on resources assigned by the initial downlink grant, downlink symbol 660 may be transmitted to a second UE based on the control information included in control information 645. While a downlink symbol 660 is illustrated in the example of FIG. 6, the control information 645 may instead include an uplink grant scheduled for another UE, which may be transmitted in a first available symbol following the last scheduled symbol of the current grant. The number of symbols of the threshold number of symbols may be selected so as to not be a significant constraint due to adding a relatively small amount of delay and may be determined based on a particular numerology used for the eCC transmissions.

Figure 7:
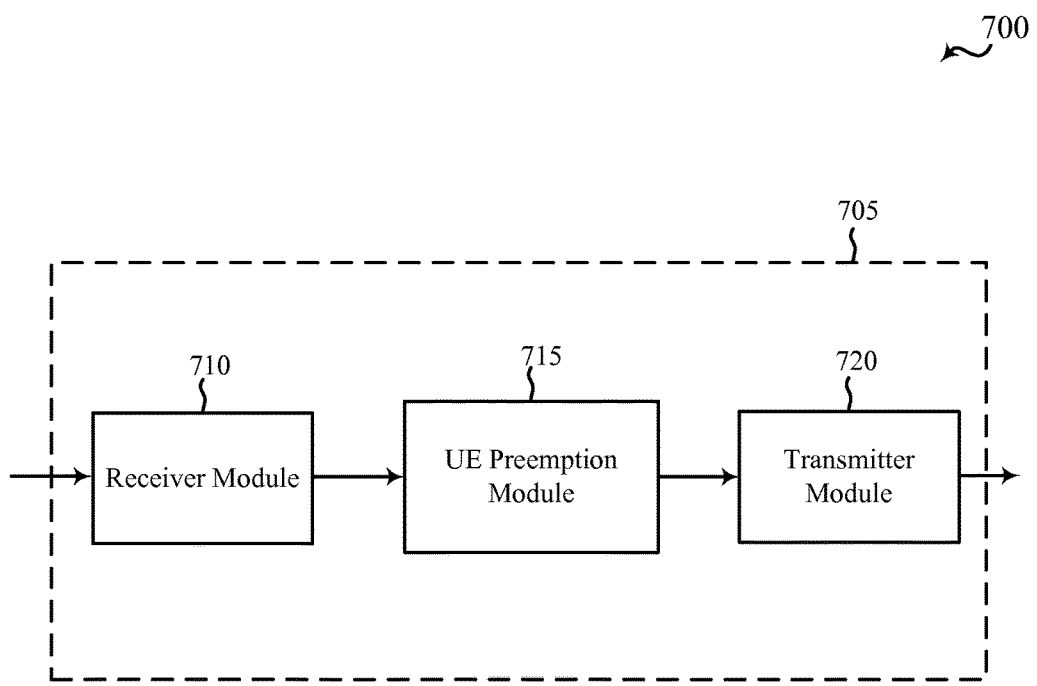
FIG. 7 shows a block diagram of a device configured for use in wireless communication, in accordance with various aspects of the present disclosure.

FIG. 7 shows a block diagram 700 of a device 705 for use in wireless communication, in accordance with various aspects of the present disclosure. The device 705 may be an example of one or more aspects of a UE 115 described with reference to FIG. 1. The device 705 may include a receiver module 710, a UE preemption module 715, and/or a transmitter module 720. The device 705 may also be or include a processor (not shown). Each of these modules may be in communication with each other. The device 705 may also represent an example of a UE 115-*a* described with reference to FIGS. 9 and 13.

The components of the device 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 710 may receive information such as packets, user data, and/or control information associated with various information channels (e.g., control channels, data channels, etc.). The receiver module 710 may be configured to receive control signals for preempting scheduled grants of downlink transmissions, and other signals that may indicate a whether such control signals are to be monitored or when such monitoring is to be performed. Information may be passed on to the UE preemption module 715, and to other components of the device 705. The receiver module 710 may also represent an example of a transceiver module 935 described with reference to FIG. 9.

The UE preemption module 715 may be configured to monitor symbols, for example one or more OFDM symbols, for a control signal indicating preemption during a multi-symbol resource grant, such as discussed above with respect to FIGS. 2-6. The transmitter module 720 may transmit the one or more signals received from other components of the device 705. The transmitter module 720 may transmit uplink data, for example. In some examples, the transmitter module 720 may be collocated with the receiver module 710 in a transceiver module. The UE preemption module 715, in combination with receiver module 710 or the transmitter module 720, or both, may determine whether to cancel a portion of resources assigned by a downlink grant. The UE preemption module 715 may be an aspect of a processor, such as the processor module 905 as described in FIG. 9.

Figure 8:
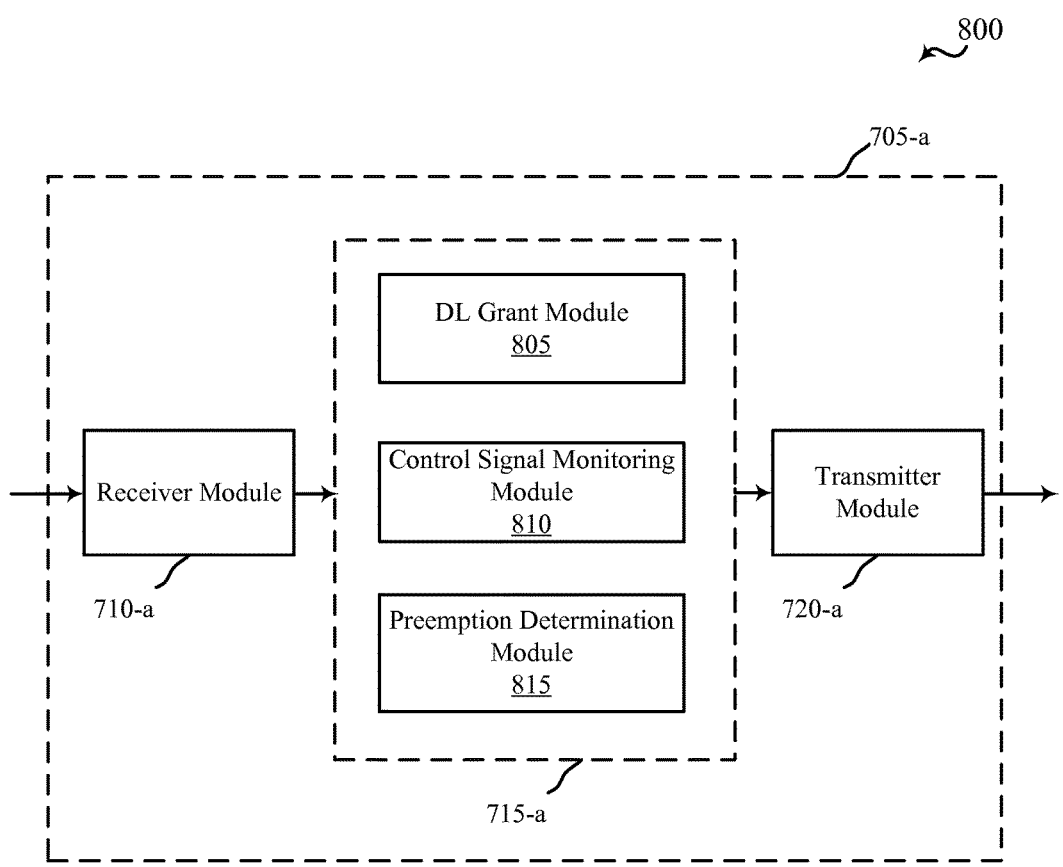
FIG. 8 shows a block diagram of a device configured for use in wireless communication, in accordance with various aspects of the present disclosure.

FIG. 8 shows a block diagram 800 of a device 705-a for use in wireless communication, in accordance with various examples. The device 705-a may be an example of one or more aspects of a UE 115 described with reference to FIG. 1. It may also be an example of a device 705 described with reference to FIG. 7. The device 705-a may include a receiver module 710-a, a UE preemption module 715-a, and/or a transmitter module 720-a, which may be examples of the corresponding modules of device 705. The device 705-a may also include a processor (not shown). Each of these components may be in communication with each other. The UE preemption module 715-a may include a downlink grant module 805, a control signal monitoring module 810, and a preemption determination module 815. The receiver module 710-a and the transmitter module 720-a may perform the functions of the receiver module 710 and the transmitter module 720, of FIG. 7, respectively. The receiver module 710-a and the transmitter module 720a may also represent examples of a transceiver module 935 as described with reference to FIG. 9.

The downlink grant module 805 may determine, based on a downlink grant, resources allocated to a UE by a base station, such as discussed above with respect to FIGS. 2-6. The control signal monitoring module 810 may monitor one or more downlink symbols for control signals that may include control information indicating that a current grant of resources is to be preempted, in a manner similar as discussed above with respect to FIGS. 2-6. The preemption determination module 815 may determine whether a current grant is to be canceled, and thus transmissions or receptions on granted resources halted, and whether a new grant is included in the control information, in a manner similar as discussed above with respect to FIGS. 2-6.

Figure 9:
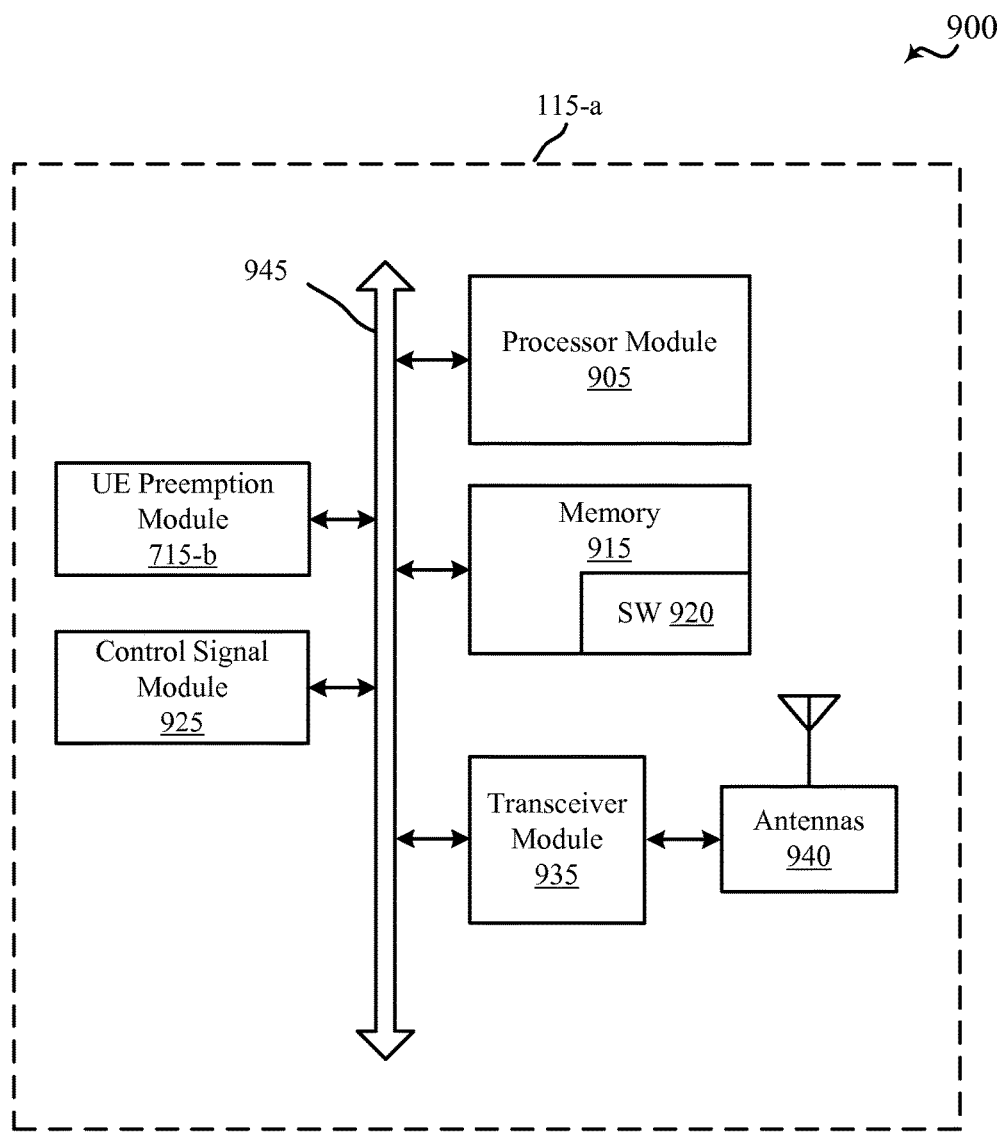
FIG. 9 shows a block diagram of a wireless communication system, in accordance with various aspects of the present disclosure.

FIG. 9 shows a system 900 for use in wireless communication, in accordance with various examples. System 900 may include a UE 115-a, which may be an example of the UEs 115 and 115-b of FIGS. 1 and 13. UE 115-a may also be an example of one or more aspects of devices 705 of FIGS. 7 and 8.

The UE 115-a may generally include components for bi-directional voice and data communications including components for transmitting communications and components for receiving communications. The UE 115-a may include antenna(s) 940, a transceiver module 935, a processor module 905, and memory 915 (including software (SW) 920), which each may communicate, directly or indirectly, with each other (e.g., via one or more buses 945). The transceiver module 935 may be configured to communicate bi-directionally, via the antenna(s) 940 and/or one or more wired or wireless links, with one or more networks, as described above. For example, the transceiver module 935 may be configured to communicate bi-directionally with base stations 105 with reference to FIG. 1. The transceiver module 935 may include a modem configured to modulate the packets and provide the modulated packets to the antenna(s) 940 for transmission, and to demodulate packets received from the antenna(s) 940. While the UE 115-a may include a single antenna 940, the UE 115-a may have multiple antennas 940 capable of concurrently transmitting and/or receiving multiple wireless transmissions. The transceiver module 935 may be capable of concurrently communicating with one or more base stations 105 via multiple component carriers.

The UE 115-a may include a UE preemption module 715-b, which may perform the functions described above for the UE preemption modules 715 of device 705 of FIGS. 7 and 8. The UE 115-a may also include a control signal module 925, that may receive control signals and make determinations related to preemption of a currently scheduled grant and a new grant that may be included in the control information of the control signals, in a manner similar as discussed above with respect to FIGS. 2-6.

The memory 915 may include random access memory (RAM) and read-only memory (ROM). The memory 915 may store computer-readable, computer-executable software/firmware code 920 containing instructions that are configured to, when executed, cause the processor module 905 to perform various functions described herein (e.g., variable TTI scheduling, determination of preemption of a grant, etc.). Alternatively, the computer-readable, computer-executable software/firmware code 920 may not be directly executable by the processor module 905 but be configured to cause a computer (e.g., when compiled and executed) to perform functions described herein. The processor module 905 may include an intelligent hardware device, e.g., a central processing unit (CPU), a microcontroller, an application-specific integrated circuit (ASIC), etc.

Figure 10:
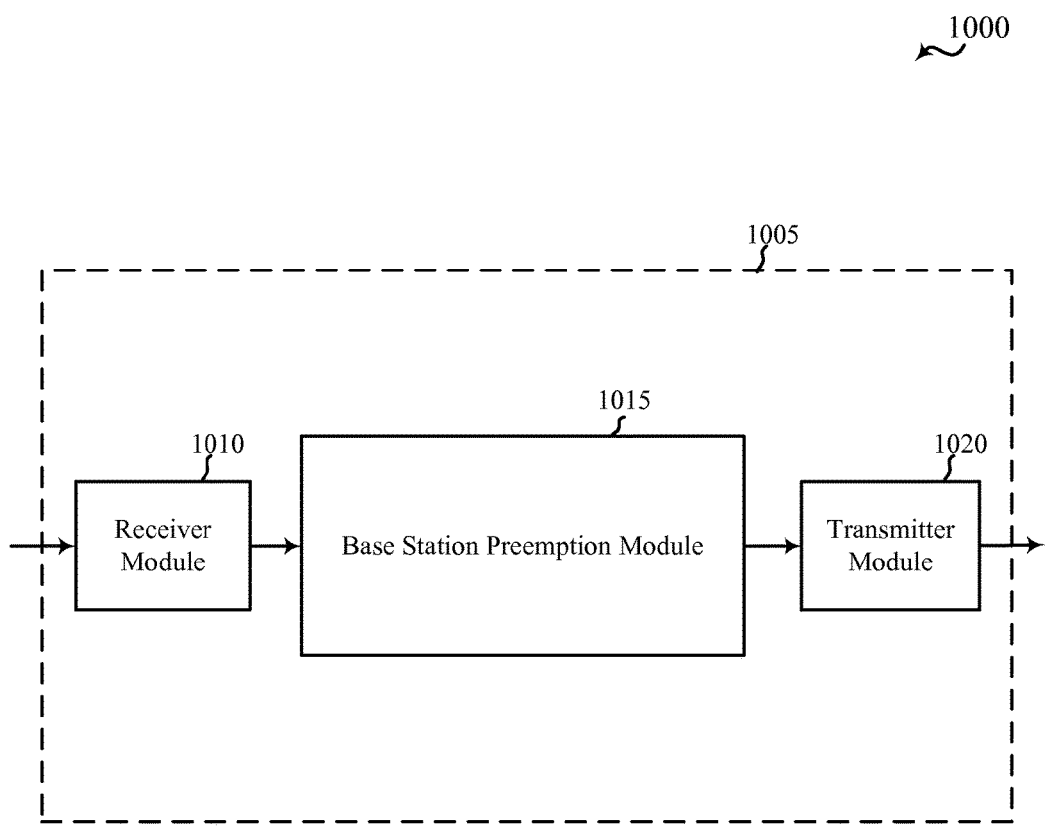
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105 described with reference to FIG. 1. In some examples, the apparatus 1005 may be part or include an LTE/LTE-A eNB and/or an LTE/LTE-A base station, similar to a base station 105 or 105-a as described in FIGS. 1 and 12. The apparatus 1005 may also be a processor, such as the base station processor module 1210 as described in FIG. 12. The apparatus 1005 may include a receiver module 1010, a base station preemption module 1015, and/or a transmitter module 1020. Each of these modules may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 1010 may include at least one radio frequency (RF) receiver, such as an RF receiver operable to uplink transmissions. The receiver module 1010 may be used to receive various types of data and/or control signals (i.e., transmissions) over one or more communication links of a wireless communication system, such as one or more communication links of the wireless communications system 100 described with reference to FIG. 1.

In some examples, the transmitter module 1020 may include at least one RF transmitter, such as at least one RF transmitter operable to transmit scheduling grants of uplink and downlink resources, and control signals that may indicate that a currently scheduled grant is to be preempted. The transmitter module 1020 may be used to transmit various types of data and/or control signals (i.e., transmissions) over one or more communication links of a wireless communication system, such as one or more communication links of the wireless communications system 100 described with reference to FIG. 1. The receiver module 1010 and the transmitter module 1020 may be examples of a transceiver module 1250 as described in FIG. 12.

In some examples, the base station preemption module 1015 may be configured to determine preemption criteria for a UE, and to transmit a control signal that indicates preemption of a currently scheduled resource grant to a UE, such as discussed above with respect to FIGS. 2-6.

Figure 11:
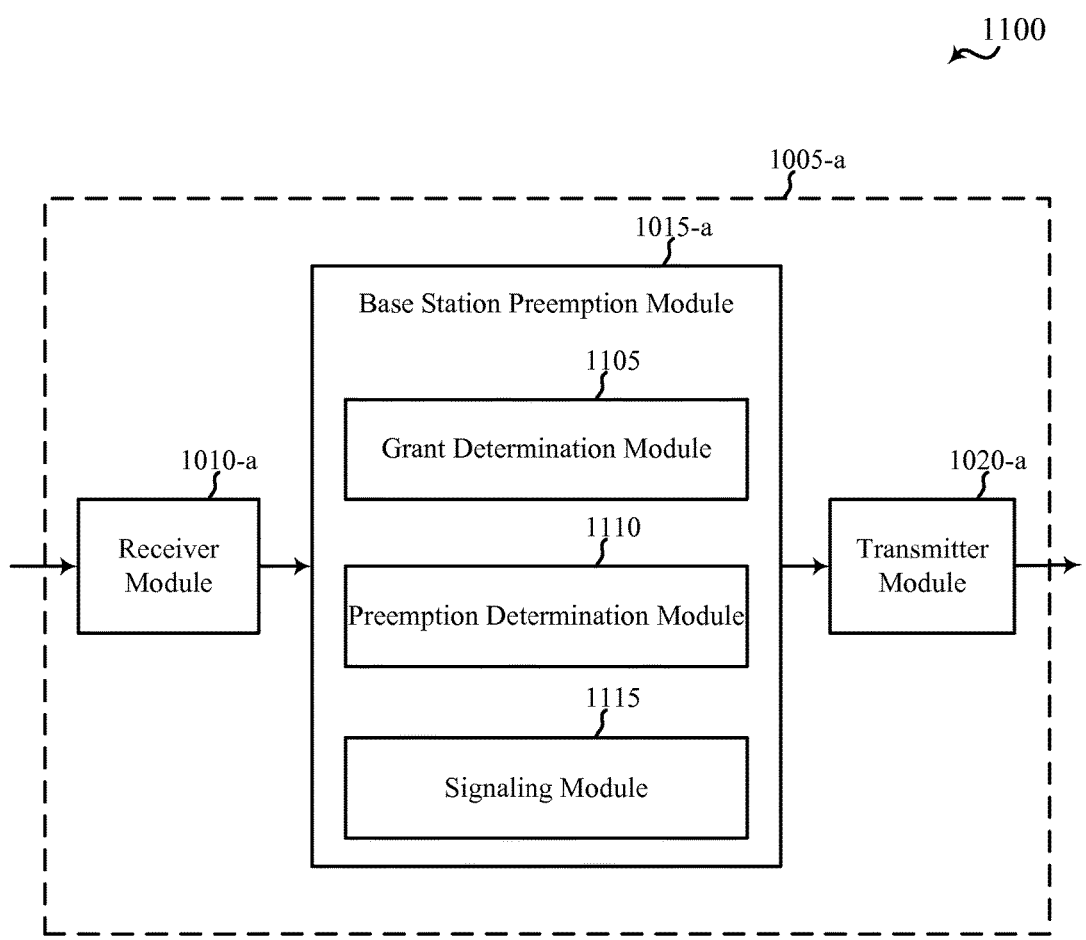
FIG. 11 shows a block diagram of an apparatus for use in wireless communication, in accordance with various aspects of the present disclosure.

FIG. 11 shows a block diagram 1100 of an apparatus 1005-a for use in wireless communication, in accordance with various aspects of the present disclosure. In some examples, the apparatus 1005-a may be an example of aspects of one or more of the base stations 105 described with reference to FIG. 1, and/or an example of aspects of the apparatus 1005 described with reference to FIG. 10. In some examples, the apparatus 1005-a may be part or include an LTE/LTE-A eNB and/or an LTE/LTE-A base station configured to transmit an eCC. The apparatus 1005-a may also be a processor. The apparatus 1005-a may include a receiver module 1010-a, a base station preemption module 1015-a, and/or a transmitter module 1020-a. Each of these modules may be in communication with each other. The receiver module 1010-a and the transmitter module 1020-a may be examples of a transceiver module 1250 as described in FIG. 12.

The components of the apparatus 1005-a may, individually or collectively, be implemented using one or more ASICs adapted to perform some or all of the applicable functions in hardware. Alternatively, the functions may be performed by one or more other processing units (or cores), on one or more integrated circuits. For example, the components of the apparatus 1005-a may include a base station processor module 1210 as described in FIG. 12. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 1010-a may be an example of one or more aspects of the receiver module 1010 described with reference to FIG. 10. In some examples, the receiver module 1010-a may include at least one radio frequency (RF) receiver, such as at least one RF receiver operable to receive uplink transmissions and data transmitted in uplink symbols of an eCC. The receiver module 1010-a may be used to receive various types of data and/or control signals (i.e., transmissions) over one or more communication links of a wireless communication system, such as one or more communication links of the wireless communications system 100 described with reference to FIG. 1.

In some examples, the transmitter module 1020-a may be an example of one or more aspects of the transmitter module 1020 described with reference to FIG. 10. In some examples, the transmitter module 1020-a may include at least one RF transmitter, such as at least one RF transmitter operable to transmit grants of uplink and downlink resources, control signals for preemption of scheduled grants, and other control information (e.g., RRC, SIB, or PDCCH signaling, etc.). The transmitter module 1020-a may be used to transmit various types of data and/or control signals (i.e., transmissions) over one or more communication links of a wireless communications system, such as one or more communication links of the wireless communications system 100 described with reference to FIG. 1.

The base station preemption module 1015-a may include a grant determination module 1105, a preemption determination module 1110, and a signaling module 1115. The receiver module 1010-a and the transmitter module 1020-a may perform the functions of the receiver module 1010 and the transmitter module 1020, of FIG. 10, respectively.

The grant determination module 1105 may determine a downlink or uplink grant for a particular UE based at least in part on data to be transmitted, and a delay sensitivity of the data to be transmitted, such as discussed above with respect to FIGS. 2-6. The preemption determination module 1110 may determine preemption criteria related to one or more UEs, and may determine that a currently scheduled grant is to be preempted, based at least in part on the preemption criteria, in a manner similar as discussed above with respect to FIGS. 2-6. The signaling module 1115 may receive information from each of the grant determination module 1105 and the preemption determination module 1110, and transmit appropriate signaling to a UE, in a manner similar as discussed above with respect to FIGS. 2-6.

Figure 12:
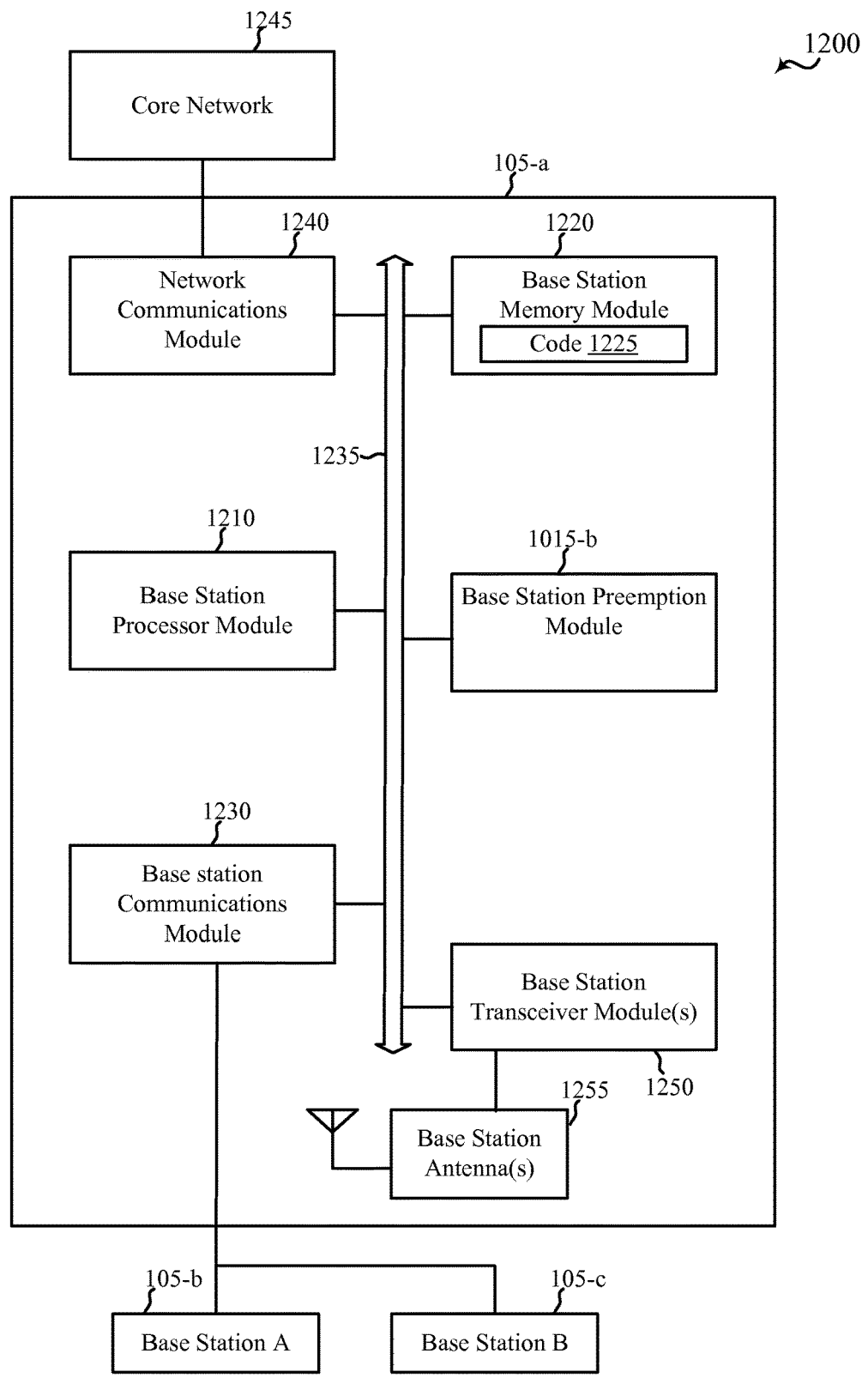
FIG. 12 shows a block diagram of a base station (e.g., a base station forming part or all of an eNB) for use in wireless communication, in accordance with various aspects of the present disclosure.

FIG. 12 shows a block diagram 1200 of a base station 105-a (e.g., a base station forming part or all of an eNB) for use in wireless communication, in accordance with various aspects of the present disclosure. In some examples, the base station 105-a may be an example of aspects of one or more of the base stations 105 described with reference to FIG. 1, and/or aspects of one or more of the apparatus 1005 when configured as a base station, as described with reference to FIGS. 10 and/or 11. The base station 105-a may be configured to implement or facilitate at least some of the base station and/or apparatus features and functions described with reference to FIGS. 2-6.

The base station 105-*a* may include a base station processor module 1210, a base station memory module 1220, at least one base station transceiver module (represented by base station transceiver module(s) 1250), at least one base station antenna (represented by base station antenna(s) 1255), and/or a base station preemption module 1015-*b*. The base station 105-*a* may also include one or more of a base station communications module 1230 and/or a network communications module 1240. Each of these modules may be in communication with each other, directly or indirectly, over one or more buses 1235.

The base station memory module 1220 may include random access memory (RAM) and/or read-only memory (ROM). The base station memory module 1220 may store computer-readable, computer-executable software/firmware code 1225 containing instructions that are configured to, when executed, cause the base station processor module 1210 to perform various functions described herein related to wireless communication (e.g., uplink and downlink grant information, variable TTI length determination, determination and signaling of uplink and downlink grants, preemption information, determination of whether to transmit control signals to preempt a currently scheduled grant, etc.). Alternatively, the computer-readable, computer-executable software/firmware code 1225 may not be directly executable by the base station processor module 1210 but be configured to cause the base station 1205 (e.g., when compiled and executed) to perform various of the functions described herein.

The base station processor module 1210 may include an intelligent hardware device, e.g., a central processing unit (CPU), a microcontroller, an ASIC, etc. The base station processor module 1210 may process information received through the base station transceiver module(s) 1250, the base station communications module 1230, and/or the network communications module 1240. The base station processor module 1210 may also process information to be sent to the transceiver module(s) 1250 for transmission through the antenna(s) 1255, to the base station communications module 1230, for transmission to one or more other base stations 105-*b* and 105-*c*, and/or to the network communications module 1240 for transmission to a core network 1245, which may be an example of one or more aspects of the core network 130 described with reference to FIG. 1. The base station processor module 1210 may handle, alone or in connection with the base station preemption module 1015-*b*, various aspects of variable length TTI management and preemption management as discussed herein.

The base station transceiver module(s) 1250 may include a modem configured to modulate packets and provide the modulated packets to the base station antenna(s) 1255 for transmission, and to demodulate packets received from the base station antenna(s) 1255. The base station transceiver module(s) 1250 may, in some examples, be implemented as one or more base station transmitter modules and one or more separate base station receiver modules. The base station transceiver module(s) 1250 may support communications in a first radio frequency spectrum band and/or a second radio frequency spectrum band. The base station transceiver module(s) 1250 may be configured to communicate bi-directionally, via the antenna(s) 1255, with one or more UEs or apparatuses, such as one or more of the UEs 115 described with reference to FIGS. 1 and/or 9. The base station 105-*a* may, for example, include multiple base station antennas 1255 (e.g., an antenna array). The base station 105-*a* may communicate with the core network 1245 through the network communications module 1240. The base station 105-*a* may also communicate with other base stations, such as the base stations 105-*b* and 105-*c*, using the base station communications module 1230. The base station transceiver module(s) 1250 may transmit or receive the various signaling and messages described with references to FIGS. 2-6.

The base station preemption module 1015-*b* may be configured to perform and/or control some or all of the features and/or functions described with reference to FIGS. 2-6 related to variable length TTI and preemption management. The base station preemption module 1015-*b*, or portions of the module 1015-*b*, may include a processor, and/or some or all of the functions of the base station preemption module 1015-*b* may be performed by the base station processor module 1210 and/or in connection with the base station processor module 1210. In some examples, the base station preemption module 1015-*b* may be an example of the base station preemption module 1015 and/or 1015-*a* described with reference to FIGS. 10 and/or 11.

Figure 13:
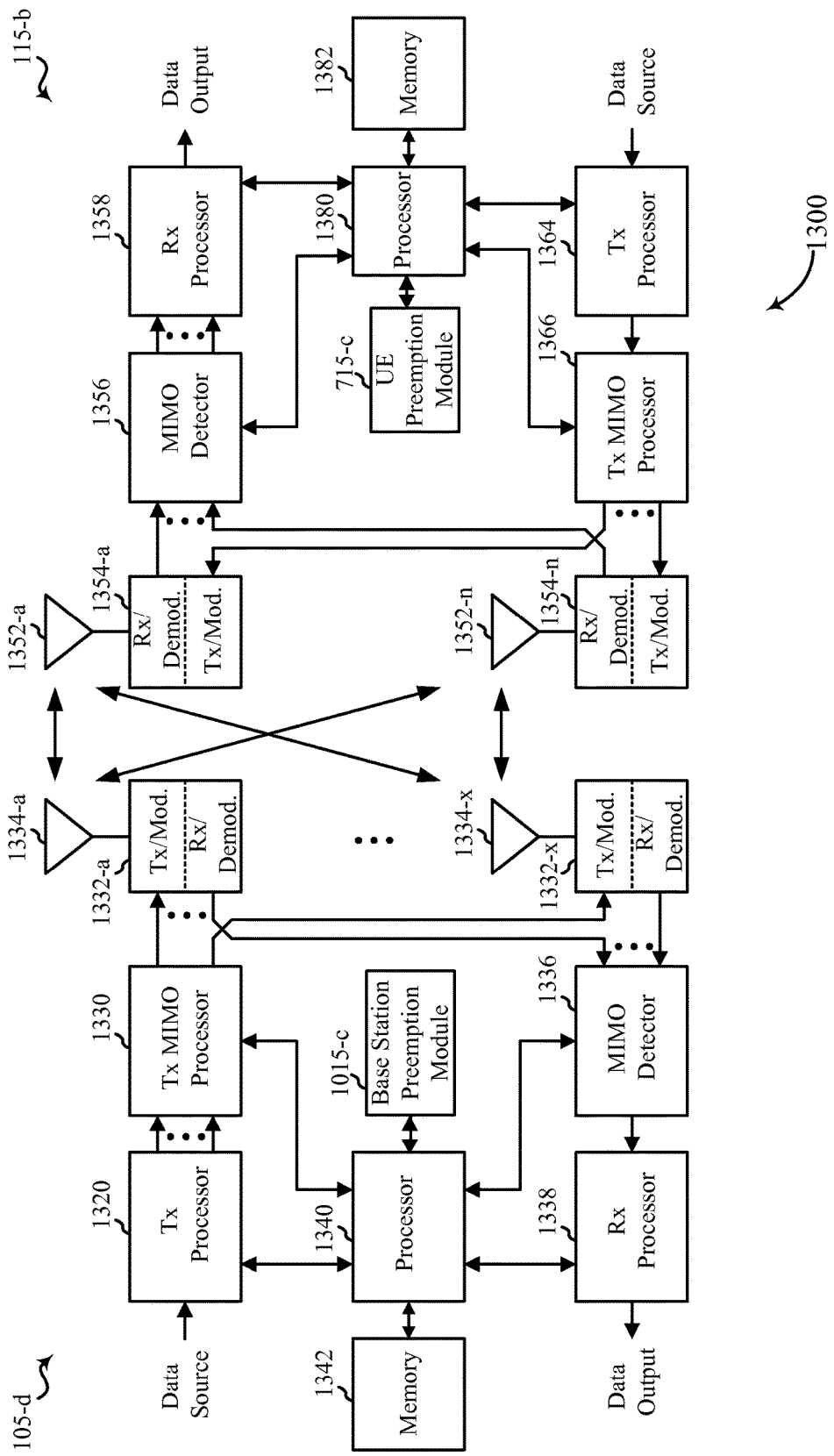
FIG. 13 shows a block diagram of a multiple-input/multiple-output communication system, in accordance with various aspects of the present disclosure.

FIG. 13 is a block diagram of a multiple input/multiple output (MIMO) communication system 1300 including a base station 105-*d* and a UE 115-*b*. The MIMO communications system 1300 may illustrate aspects of the wireless communications system 100 shown in FIG. 1. The base station 105-*d* may be equipped with antennas 1334-*a* through 1334-*x*, and the UE 115-*b* may be equipped with antennas 1352-*a* through 1352-*n*. In the MIMO communications system 1300, the base station 105-*d* may be able to send data over multiple communication links at the same time. Each communication link may be called a "layer" and the "rank" of the communication link may indicate the number of layers used for communication. For example, in a 2×2 MIMO communications system where base station 105-*d* transmits two "layers," the rank of the communication link between the base station 105-*d* and the UE 115-*b* is two.

At the base station 105-*d*, a transmit processor 1320 may receive data from a data source. The transmit processor 1320 may process the data. The transmit processor 1320 may also generate control symbols and/or reference symbols, where a symbol may be one or more OFDM symbols. A transmit (TX) MIMO processor 1330 may perform spatial processing (e.g., precoding) on data symbols, control symbols, and/or reference symbols, if applicable, and may provide output symbol streams to the transmit modulators/receiver demodulators 1332-*a* through 1332-*x*. Each transmit modulator/receiver demodulator 1332 may process a respective output symbol stream (e.g., for OFDM, etc.) to obtain an output sample stream. Each transmit modulator/receiver demodulator 1332 may further process (e.g., convert to analog, amplify, filter, and upconvert) the output sample stream to obtain a DL signal. In one example, DL signals from transmit modulators/receiver demodulators 1332-*a* through 1332-*x* may be transmitted via the antennas 1334-*a* through 1334-*x*, respectively.

At the UE 115-*b*, the UE antennas 1352-*a* through 1352-*n* may receive the DL signals from the base station 105-*d* and may provide the received signals to the demodulators 1354-*a* through 1354-*n*, respectively. Each demodulator 1354 may condition (e.g., filter, amplify, downconvert, and digitize) a respective received signal to obtain input samples. Each demodulator 1354 may further process the input samples (e.g., for OFDM, etc.) to obtain received symbols. A MIMO detector 1356 may obtain received symbols from all the demodulators 1354-*a* through 1354-*n*, perform MIMO detection on the received symbols, if applicable, and provide detected symbols. A receive processor 1358 may process (e.g., demodulate, deinterleave, and decode) the detected symbols, providing decoded data for the UE 115-*b* to a data output, and provide decoded control information to a processor 1380, or memory 1382.

The processor 1380 may in some cases execute stored instructions to instantiate one or more of a UE preemption module 715-*c*. The UE preemption module 715-*c* may be an example of aspects of the UE preemption module 715 described with reference to FIGS. 7, 8 and/or 9.

On the uplink (UL), at the UE 115-*b*, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the demodulators 1354-*a* through 1354-*n* (e.g., for SC-FDMA, etc.), and be transmitted to the base station 105-*d* in accordance with the transmission parameters received from the base station 105-*d*. At the base station 105-*d*, the UL signals from the UE 115-*b* may be received by the antennas 1334, processed by the transmit modulators/receiver demodulators 1332, detected by a MIMO detector 1336 if applicable, and further processed by a receive processor 1338. The receive processor 1338 may provide decoded data to a data output and to the processor 1340 and/or memory 1342. The processor 1340 may in some cases execute stored instructions to instantiate one or more of a base station preemption module 1015-*c*. The base station preemption module 1015-*c* may be an example of aspects of the base station preemption module 1015 described with reference to FIGS. 10, 11 and/or 12.

The components of the UE 115-*b* may, individually or collectively, be implemented with one or more ASICs adapted to perform some or all of the applicable functions in hardware. Each of the noted modules may be a means for performing one or more functions related to operation of the MIMO communications system 1300. Similarly, the components of the base station 105-*c* may, individually or collectively, be implemented with one or more ASICs adapted to perform some or all of the applicable functions in hardware. Each of the noted components may be a means for performing one or more functions related to operation of the MIMO communications system 1300.

Figure 14:
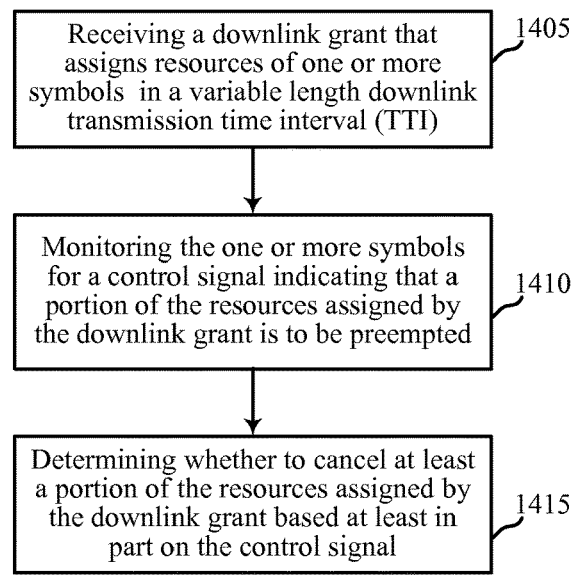
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs 115 described with reference to FIGS. 1, 9 and/or 13, and/or aspects of one or more of the devices 705 described with reference to FIGS. 7 and/or 8. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include receiving a downlink grant that assigns resources of one or more symbols in a variable length downlink transmission time interval (TTI). The operation(s) at block 1405 may be performed using the UE preemption module 715 described with reference to FIGS. 7-9 and/or 13. The receiving may be performed by, for example, a transceiver module 935 described with reference to FIG. 9.

At block 1410, the method 1400 may include monitoring the one or more symbols in the downlink grant for a control signal indicating that a portion of the resources assigned by the downlink grant is to be preempted. The operation(s) at block 1410 may be performed using the UE preemption module 715 described with reference to FIGS. 7-9 and/or 13.

At block 1415, the method 1400 may include determining whether to cancel at least the portion of the resources assigned by the downlink grant based at least in part on the control signal. The operation(s) at block 1415 may be performed using the UE preemption module 715 described with reference to FIGS. 7-9 and/or 13.

Thus, the method 1400 may provide for wireless communication. It should be noted that the method 1400 is just one implementation and that the operations of the method 1400 may be rearranged or otherwise modified such that other implementations are possible.

Figure 15:
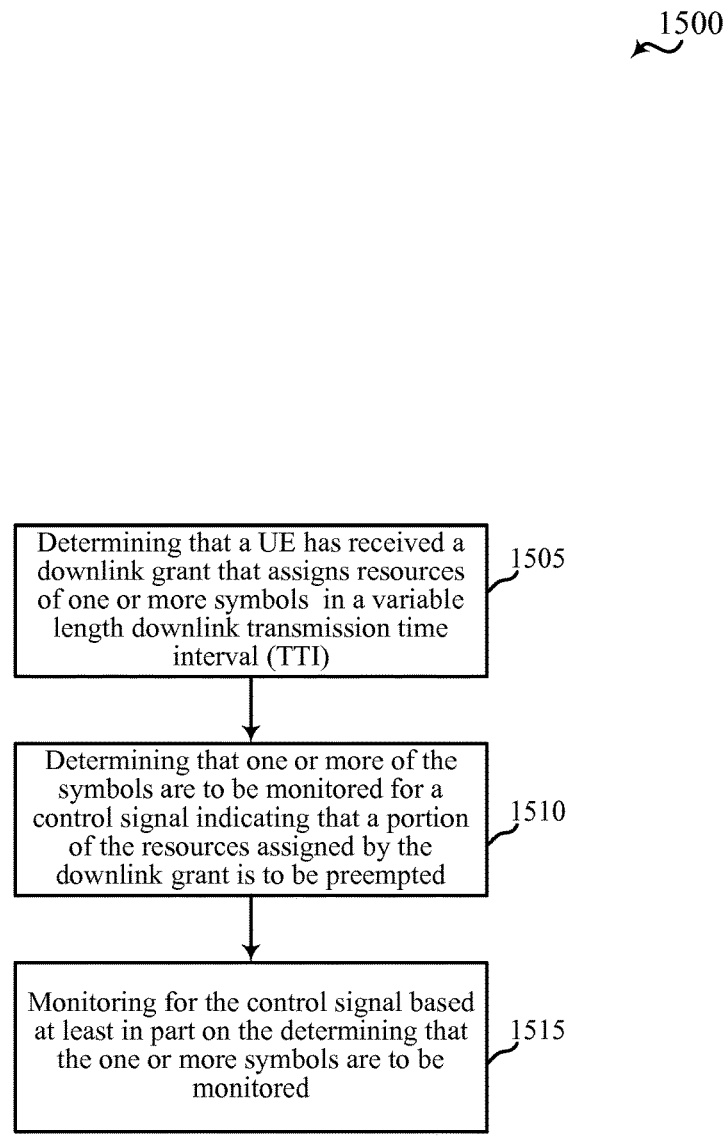
FIG. 15 is a flow chart illustrating another example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115 described with reference to FIGS. 1, 9 and/or 13, and/or aspects of one or more of the devices 705 described with reference to FIGS. 7 and/or 8. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include determining that a UE has received a downlink grant that assigns resources of one or more symbols in a variable length downlink transmission time interval (TTI) as described above with reference to FIGS. 2 through 6. The operation(s) at block 1505 may be performed using the UE preemption module 715 described with reference to FIGS. 7-9 and/or 13.

At block 1510, the method 1500 may include determining that one or more of the symbols are to be monitored for a control signal indicating that a portion of the downlink grant is to be preempted. The operation(s) at block 1510 may be performed using the UE preemption module 715 described with reference to FIGS. 7-9 and/or 13.

At block 1515, the method 1500 may include monitoring for the control signal based at least in part on the determining that one or more of the one or more symbols are to be monitored. The control signal may include a second downlink grant for downlink transmissions to a second UE. In some cases, the downlink transmissions to the second UE are more delay sensitive than downlink data associated with resources assigned by the downlink grant to a first UE. In some examples, the control signal includes an uplink grant for a subsequent symbol. The control signal may, in some examples, include a common signal decoded by several (e.g., a plurality of) UEs. Monitoring one or more of the symbols may include monitoring one or more predetermined symbols with the one or more symbols that have resources assigned by the downlink grant. The predetermined symbols may be designated in a downlink grant or via RRC signaling. The operation(s) at block 1515 may be performed using the UE preemption module 715 described with reference to FIGS. 7-9 and/or 13.

In some examples, the method 1500 may also include cancelling at least the portion of the resources assigned by the downlink grant. In some cases, determining whether to cancel resources includes determining that the control signal is received in a symbol within a threshold number of symbols from a last symbol of the variable length downlink TTI and, for instance, maintaining the resources, or continuing to utilize the resources, assigned by the downlink grant by continuing to receive any remaining symbols of the variable length TTI.

In some cases, the method 1500 may also include canceling at least the portion of the resources assigned by the downlink grant based at least in part on the control signal. The method 1500 may also include determining a duration of a second downlink transmission associated with the control signal and, for instance, suspending the monitoring of downlink transmissions during the determined duration. The method 1500 may also include continuing to monitor downlink transmissions following the determined duration.

Thus, the method 1500 may provide for wireless communication. It should be noted that the method 1500 is just one implementation and that the operations of the method 1500 may be rearranged or otherwise modified such that other implementations are possible.

Figure 16:
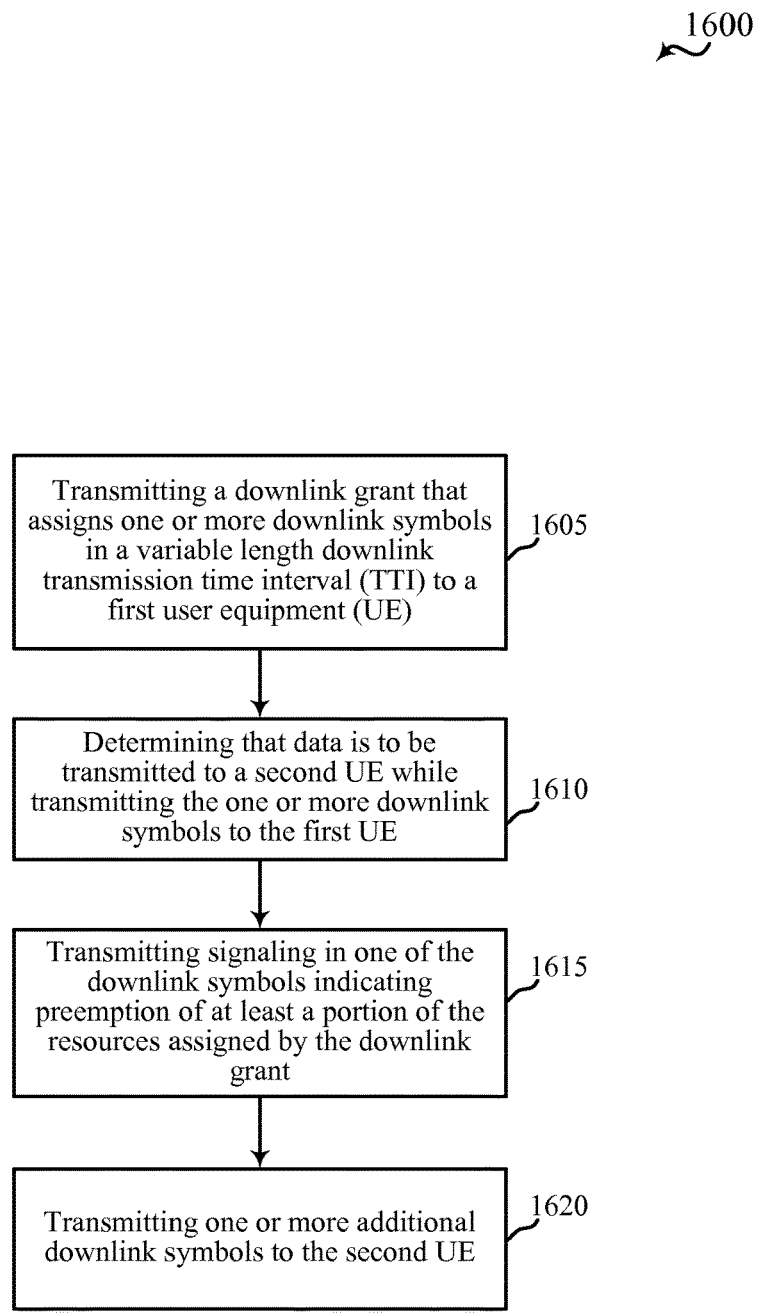
FIG. 16 is a flow chart illustrating another example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations 105 described with reference to FIGS. 1, 12 and/or 13, and/or aspects of one or more of the apparatuses (e.g., devices) 1005 described with reference to FIGS. 10 and/or 11. In some examples, a UE may execute one or more sets of codes to control the functional elements of the base station to perform the functions described below. Additionally or alternatively, the base station may perform one or more of the functions described below using special-purpose hardware.

At block 1605, the method 1600 may include transmitting a downlink grant that assigns one or more downlink symbols in a variable length downlink transmission time interval (TTI) to a first user equipment (UE). The operation(s) at block 1605 may be performed using the base station preemption module 1015 described with reference to FIGS. 10-13.

At block 1610, the method 1600 may include determining that data is to be transmitted to a second UE while transmitting the one or more downlink symbols to the first UE, as described above with reference to FIGS. 2 through 6. The operation(s) at block 1610 may be performed using the base station preemption module 1015 described with reference to FIGS. 10-13.

At block 1615, the method 1600 may include transmitting signaling in one of the downlink symbols indicating preemption of at least the portion of the resources assigned by the downlink grant. The operation(s) at block 1615 may be performed using the base station preemption module 1015 described with reference to FIGS. 10-13. Transmitting signaling in one of the downlink symbols may be performed by, for example, a transceiver module 1250.

At block 1620, the method 1600 may include transmitting one or more additional downlink symbols to the second UE. The operation(s) at block 1620 may be performed using the base station preemption module 1015 described with reference to FIGS. 10-13.

Thus, the method 1600 may provide for wireless communication. It should be noted that the method 1600 is just one implementation and that the operations of the method 1600 may be rearranged or otherwise modified such that other implementations are possible.

In some examples, aspects from two or more of the methods 1400, 1500, or 1600 may be combined. It should be noted that the methods 1400, 1500, 1600 are just example implementations, and that the operations of the methods 1400-1600 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication by a first user equipment (UE) in communication with a base station, comprising:
   receiving, at the first UE, a downlink grant that assigns resources of one or more symbols in a variable length downlink transmission time interval (TTI) for transmission to the first UE;
   monitoring, at the first UE, one or more of the one or more symbols of the variable length downlink TTI for a control signal indicating that a portion of the resources assigned by the downlink grant is to be preempted for transmission to a second UE;
   determining, at the first UE based at least in part on the control signal, whether to process the portion of the resources assigned by the downlink grant indicated to be preempted; and
   discontinuing processing, at the first UE based at least in part on the determining, of the portion of the resources assigned by the downlink grant indicated to be preempted.

2. The method of claim 1, wherein the control signal comprises a second downlink grant for at least one downlink transmission to the second UE.

3. The method of claim 2, wherein the at least one downlink transmission to the second UE is more delay sensitive than downlink data associated with the resources assigned by the downlink grant to the first UE.

4. The method of claim 1, wherein the control signal comprises an uplink grant for a subsequent symbol for at least one uplink transmission from the second UE.

5. The method of claim 1, wherein the control signal comprises a common signal decoded by a plurality of UEs.

6. The method of claim 5, wherein the plurality of UEs are configured to monitor for the control signal via radio resource control (RRC) signaling.

7. The method of claim 1, wherein the monitoring one or more of the one or more symbols comprises:
   monitoring one or more predetermined symbols within the one or more symbols.

8. The method of claim 7, wherein the predetermined symbols are designated in one or more of the downlink grant or via radio resource control (RRC) signaling.

9. The method of claim 1, further comprising:
   determining, at the first UE, a duration of a second downlink transmission associated with the control signal;
   suspending monitoring of downlink transmissions during the determined duration; and
   resuming monitoring of downlink transmissions following the determined duration.

10. An apparatus for wireless communication by a first user equipment (UE) in communication with a base station, comprising:
    means for receiving, at the first UE, a downlink grant that assigns resources of one or more symbols in a variable length downlink transmission time interval (TTI) for transmission to the first UE;
    means for monitoring, at the first UE, one or more of the one or more symbols of the variable length downlink TTI for a control signal indicating that a portion of the resources assigned by the downlink grant is to be preempted for transmission to a second UE;

means for determining, at the first UE based at least in part on the control signal, whether to process the portion of the resources assigned by the downlink grant indicated to be preempted; and means for discontinuing processing, at the first UE based at least in part on the determining, of the portion of the resources assigned by the downlink grant indicated to be preempted.

11. The apparatus of claim 10, wherein the control signal comprises a second downlink grant for at least one downlink transmission to the second UE.

12. The apparatus of claim 11, wherein the at least one downlink transmission to the second UE is more delay sensitive than downlink data associated with the resources assigned by the downlink grant to the first UE.

13. The apparatus of claim 10, wherein the means for monitoring one or more of the one or more symbols is operable to monitor one or more predetermined symbols within the one or more symbols.

14. The apparatus of claim 10, further comprising:
means for determining, at the first UE, a duration of a second downlink transmission associated with the control signal;
means for suspending monitoring of downlink transmissions during the determined duration; and
means for resuming monitoring of downlink transmissions following the determined duration.

15. An apparatus for wireless communication by a first user equipment (UE) in communication with a base station, comprising:
a processor;
memory in electronic communication with the processor; and
instructions stored in the memory, the instructions being executable by the processor to cause the apparatus to:
receive, at the first UE, a downlink grant that assigns resources of one or more symbols in a variable length downlink transmission time interval (TTI) for transmission to the first UE;
monitor, at the first UE, one or more of the one or more symbols of the variable length downlink TTI for a control signal indicating that a portion of the resources assigned by the downlink grant is to be preempted for transmission to a second UE;
determine, at the first UE based at least in part on the control signal, whether to process the portion of the resources assigned by the downlink grant indicated to be preempted; and
discontinue processing, at the first UE based at least in part on the determining, of the portion of the resources assigned by the downlink grant indicated to be preempted.

16. The apparatus of claim 15, wherein the control signal comprises a second downlink grant for at least one downlink transmission to the second UE.

17. The apparatus of claim 16, wherein the at least one downlink transmission to the second UE is more delay sensitive than downlink data associated with the resources assigned by the downlink grant to the first UE.

18. The apparatus of claim 15, wherein the control signal comprises an uplink grant for a subsequent symbol for at least one uplink transmission from the second UE.

19. The apparatus of claim 15, wherein the control signal comprises a common signal decoded by a plurality of UEs.

20. The apparatus of claim 19, wherein the plurality of UEs are configured to monitor for the control signal via radio resource control (RRC) signaling.

21. The apparatus of claim 15, wherein the instructions are executable by the processor to cause the apparatus to:
monitor one or more of the one or more symbols by monitoring one or more predetermined symbols within the one or more symbols in the resources assigned by the downlink grant.

22. The apparatus of claim 21, wherein the predetermined symbols are designated in one or more of the downlink grant or via radio resource control (RRC) signaling.

23. The apparatus of claim 15, wherein the instructions are executable by the processor to cause the apparatus to:
determine, at the first UE, a duration of a second downlink transmission associated with the control signal;
suspend monitoring of downlink transmissions during the determined duration; and
resume monitoring of downlink transmissions following the determined duration.

24. A non-transitory computer-readable medium storing computer-executable code for wireless communication by a first user equipment (UE) in communication with a base station, the code executable by a processor to:
receive, at the first UE, a downlink grant that assigns resources of one or more symbols in a variable length downlink transmission time interval (TTI) for transmission to the first UE;
monitor, at the first UE, one or more of the one or more symbols of the variable length downlink TTI for a control signal indicating that a portion of the resources assigned by the downlink grant is to be preempted for transmission to a second UE;
determine, at the first UE based at least in part on the control signal, whether to process the portion of the resources assigned by the downlink grant indicated to be preempted; and
discontinue processing, at the first UE based at least in part on the determining, of the portion of the resources assigned by the downlink grant indicated to be preempted.

* * * * *